United States Patent [19]

Martin

[11] 4,196,400
[45] Apr. 1, 1980

[54] GAS LASER CHEMICAL PUMP FLUIDIZATION

[76] Inventor: William D. Martin, 8724 Edgehill Drive SE, Huntsville, Ala. 35802

[21] Appl. No.: 873,463

[22] Filed: Jan. 30, 1978

[51] Int. Cl.$^2$ .............................................. H01S 3/00
[52] U.S. Cl. .............................................. 331/94.5 G
[58] Field of Search ..................... 331/94.5 G, 94.5 T, 331/94.5 P; 330/4.3; 422/139

[56] References Cited

U.S. PATENT DOCUMENTS

| | | | |
|---|---|---|---|
| 3,429,654 | 2/1969 | Friedrichsen et al. | 422/139 |
| 3,992,685 | 11/1976 | Ogren et al. | 331/94.5 G |
| 4,031,484 | 6/1977 | Freiberg et al. | 331/94.5 G |

Primary Examiner—James W. Davie
Attorney, Agent, or Firm—Nathan Edelberg; Robert P. Gibson; Jack W. Voigt

[57] ABSTRACT

An improvement to the chemical pump as currently used to pump a gas laser cavity is achieved by employing a chemical pump with a fluidized bed, i.e., a bed of particles of a reactive material wherein the particles are suspended in a column by an inert driving fluid. The driving fluid which is nonreactive with the particles of reactive material can be selected from the group consisting of helium and argon. In addition to its function to fluidize the particles of reactive material, the driving fluid can function for some designs to load or unload the particle bed material. The reactive material is selected from the materials consisting of lithium, sodium, potassium, rubidium, cesium, calcium, strontium, barium, titanium, zirconium, hafnium, and alloys of the same which are reactive with the laser effluent gases which include various mixtures of hydrogen, deuterium, nitrogen, hydrogen fluoride, deuterium fluoride, and other combustion products. The reactive materials form solids or liquids from the effluent gases which are brought into intimate contact with the fluidized bed. Fluidization of the bed results from flow of the laser effluent gases as augmented by the driving fluid to maintain the proper fluidization and particle motion to maintain the reaction required for retention of the low pressure necessary for efficient operation of the laser. The particle motion also serves to reduce the temperature gradients in the bed and increases the heat transfer from the bed to the container walls.

9 Claims, 1 Drawing Figure

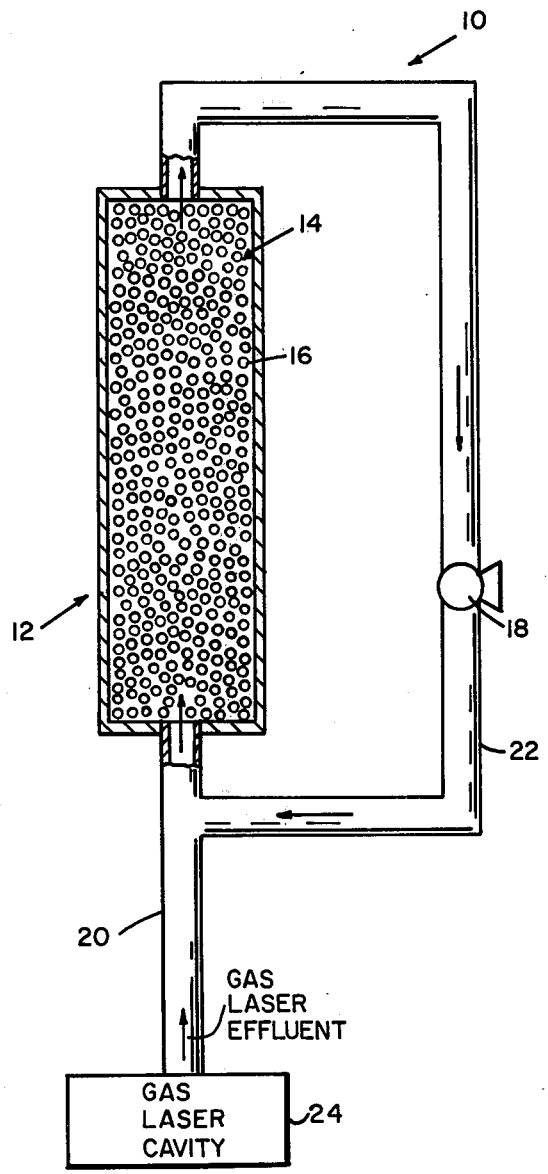

GAS LASER CHEMICAL PUMP FLUIDIZATION

DEDICATORY CLAUSE

The invention described herein may be manufactured, used, and licensed by or for the Government for governmental purposes without the payment to me of any royalties thereon.

BACKGROUND OF THE INVENTION

The chemical pump as currently used to pump the HF/DF chemical laser cavity consists of sheets of reactive material which react with the laser effluent gases which consist generally of mixtures of hydrogen, deuterium, nitrogen, hydrogen fluoride, deuterium fluoride or other combustion products. The reaction which occurs between the effluent gases and the reactive material results in formation of solid products which effectively remove the gases from the system to thereby maintain the low pressures required for efficient operation of the laser.

For high efficiency of operation of a chemically pumped gas laser intimate contact of the effluent gases with the reactive material is required. As the reaction proceeds and as the solid sheets of reactive material react with the effluent gases, the effective surface area decreases which would necessitate passing the effluent gases through additional canisters as required for maintaining the low pressures in the laser cavity as necessary for efficient operation of the laser.

Desirable would be a system to permit more efficient utilization of the reactive material to ensure longer operational time under low pressure conditions.

An object of this invention is to provide a system which achieves greater efficiency of reaction between the effluent gases and the chemical pump reactive material employed to chemically pump a gas laser system.

Another object of this invention is to provide a system that imparts fluidization to the bed of particles to thereby yield greater efficiency of reaction between the effluent gases and the chemical pump reactive material to effect a reduction in the size of the chemical pump system.

A further object of this invention is to provide a system which increases the ability to transfer heat out of the system by: (1) cooling the inert driver gas after it leaves the bed and before it reenters the bed, (2) increasing the heat transfer rate to the bed walls since the movement of the particles evenly distributes the heat throughout the bed and changes the heat transfer mode from conduction to convection.

SUMMARY OF THE INVENTION

A fluidized bed is comprised of solid, discrete particles of a reactive material disposed in a reactor column, e.g., the reactive material is selected from the group consisting of lithium, sodium, potassium, rubidium, cesium, calcium, strontium, barium, titanium, zirconium, hafnium, and alloys of the same. The reactor column is adapted for receiving the effluent gases from an in service gas laser. The solid particles are fluidized or suspended in a column by a recirculated driving fluid which can be selected from inert gases such as helium and argon. The flow of the effluent gases from the gas laser through the fluidized particle bed allows intimate contact of the bed particles with the effluent gases for reaction. The bed is maintained in a fluidized state by the recirculated driving fluid. The effluent laser gases form solid and/or liquid reaction products when contact is made with the reactive material. The reaction which takes place to remove the effluent gases from the gaseous phase to the solid and/or liquid phase effectively maintains the low pressure required for efficient operation of the laser. A filter can be used to effectively remove any liquid phase reaction products if needed.

BRIEF DESCRIPTION OF THE DRAWING

The FIGURE of the drawing is a schematic drawing of a chemical pump with a fluidized bed.

DESCRIPTION OF THE PREFERRED EMBODIMENT

The chemical pump of this invention is comprised of a bed of particles of a reactive material disposed in a container adapted for receiving the effluent gases from a gas laser. The chemical pump as described is equipped with a means for recirculating an inert driving fluid which can be selected from gases such as helium or argon. Any other gases which do not react with the particle bed may also be selected. The chemical pump is charged prior to use with a material in particle form that is reactive with the effluent gases discharged from an in service gas laser. The reactive material is selected from the group consisting of lithium, sodium, potassium, rubidium, cesium, calcium, strontium, barium, titanium, zirconium, hafnium, and alloys of the same. The reactive material is changed in the form of a bed of particles and the bed of particles is fluidized or suspended in a column by the recirculated driving fluid. The flow of the driving fluid through bed "fluidizes" the particles such that they behave as a fluid. The motion imparted to the particles allows intimate contact of the bed particles with the driving fluid and the laser effluent gases. For an HF/DF chemical laser these gases consist of various mixtures of hydrogen, deuterium, nitrogen, hydrogen or deuterium fluoride, and various combustion products such as carbon tetrafluoride. For other types of lasers there would be other types of effluents which would consist of the reaction products formed from the reactants of the gas laser system. The reaction takes place between the laser effluent gases and the solid particles so that the laser effluent gases are effectively removed from the system to thereby maintain the low pressures required for efficient operation of the laser.

In further reference to the Drawing, reference numeral 10 depicts a diagrammatic view of a chemical pump for removing the laser effluent gases from a gas laser cavity 24. The chemical pump is comprised of a reactor column 12 including a disposed particle bed 14 that consists of particles of a material that is reactive with the laser effluent gases. The particle bed 14 is illustrated in a fluidized state wherein the bed particles 16 are shown in a suspended column as a result of motion imparted to them by a driving fluid (not shown) selected from gases which are not reactive with the laser effluent which is circulated and recirculated by a variable capacity driving fluid pump 18. The chemical pump column is provided with a suitable first conduit 20 for receiving the laser effluent gases from a gas laser cavity 24 and a suitable second conduit which is a recirculating conduit 22 in a closed loop configuration for circulating and recirculating the driving fluid to suspend the particles of the particle bed to allow intimate contact of the bed particles with the driving fluid and the laser effluent gases. The laser effluent gases, as described earlier, are effectively removed from the system when they form solid and/or liquid products, and as a result thereof, the low pressure required for efficient operation of the gas laser is maintained. Screens and/or filters (not shown) can be employed, if needed, in the recirculating conduit 22.

The fluidized bed technology is well developed and used extensively in the chemical process industry in absorption, catalyzation, and kinetic processes. The application of fluidized technology as disclosed in accordance with this invention provides an improvement to the chemical pumps as used to pump the HF/DF gas laser cavity. Other gas lasers (e.g., HI, HCl, iodine, bromine, CO, and $CO_2$) can be chemically pumped with the improved chemical pump employing a fluidized bed in accordance with this invention. The selection of material for the fluidized bed for reaction with the effluents from the laser cavity, and the selection of the driving gases can be made without changing the basic principle of this disclosure. Other benefits of the fluidized chemical pump as contrasted with the presently used chemical pump relate to the exchange of new material for spent chemical pump material. The unreacted bed material could be fed in continuously or changed in batches via pumping of the bed. Modifications of the disclosed embodiment could be made to eliminate the need to manually change the heavy chemical pump canisters which include bed material, a valve, and the bed container. In packaging the fluidized bed system one or at most several reaction chambers could be used instead of the 60 or more chemical pump canisters envisioned for a moderately sized laser system. The fluidized bed concept would result in a savings in systems volume.

The operation of the fluidized bed in conjunction with a chemical pump would vary in accordance with pressure conditions of the gas laser cavity. Also, the quantity of the driver gas may vary in accordance with the output of laser effluent gases. In fact, the laser effluent gases will provide a certain amount of aeration, thus the driving fluid pump should be preferably one of a variable capacity to provide the fluidized state necessary to ensure proper contact between the reactive particles and the laser effluent gases desired to be removed. In operation of the driving fluid pump the pressure should be adjusted to not exceed the pressure of the laser effluent gases. Thus, in maintaining the recirculation of the driving fluid gases, various controls, pressure sensitive devices, and pressure regulating orifices may be required for the conditions in consonance with operating conditions of the gas laser cavity.

The particle size of the reactive particle material can vary in accordance with the required surface area for reacting in accordance with a particular use and mode of operation. The particle size should be in consonance with the recirculating driving fluid pressure and flow rate to achieve complete reaction and retain a fluidized state and the required low pressure necessary for efficient operation of the laser.

The term gas laser as used in this invention includes gas dynamic lasers, electric discharge lasers, and chemical lasers for the embodiments specified.

I claim:

1. In combination with a gas laser cavity, a chemical pump with a fluidized bed for reacting with the gaseous species of the laser effluent to remove said gaseous species by forming solid and/or liquid compounds which effectively remove said gaseous species to thereby maintain the low pressure required for efficient operation of said gas laser cavity, said chemical pump with a fluidized bed comprising:

(i) a reactor column having an inlet end and outlet end, said reactor column including a particle bed disposed within, said particle bed comprised of a reactive material in discrete particle form that is reactive with the gaseous species of said laser effluent, said reactor column when in operation additionally containing a driving fluid that is nonreactive with said reactive material;

(ii) a first conduit in communicative combination with said chemical laser cavity and said reactor column for receiving said gaseous species that are discharged from said gas laser cavity when in operation;

(iii) a second conduit in communicative combination with said first conduit intermediate said gas laser cavity and said inlet end of said reactor column, said second conduit extending in a closed-loop configuration between said inlet and said outlet end of said reactor column; and (iv) a driving fluid pump positioned in said second conduit for circulating said driving fluid through said particle bed to impart motion to particles of said reactive material and to suspend said particles in a fluidized state, said fluidized state allowing intimate contact of said reactive material and said gaseous species to enable a reaction to take place whereby solid and/or liquid compounds are formed from said gaseous species and said gaseous species are effectively removed from laser effluent gases to thereby maintain the low pressure required for efficient operation of said gas laser.

2. The combination of claim 1 wherein said chemical pump with a fluidized bed is in combination with an HF gas laser and wherein said reactive material is selected from the group consisting of lithium, sodium, potassium, rubidium, cesium, calcium, strontium, barium, titantium, zirconium, hefnium, and alloys of said selected reactive material for reaction with said HF gas laser effluent gases which include various mixtures of hydrogen, nitrogen, deuterium fluoride, hydrogen fluoride, and other combustion products, and wherein said driving fluid is selected from helium and argon.

3. The combination of claim 1 wherein said chemical pump with a fluidized bed is in combination with a DF gas laser and wherein said reactive material is selected from the group consisting of lithium, sodium, potassium, rubidium, cesium, calcium, strontium, barium, titantium, zirconium, hafnium, and alloys of said selected reactive material for reaction with said DF gas laser effluent gases which include various mixtures of deuterium, nitrogen, hydrogen fluoride, deuterium fluoride, and other combustion products, and wherein said driving fluid is selected from helium and argon.

4. The combination of claim 1 wherein said chemical pump with a fluidized bed is in combination with an iodine gas laser and wherein said reactive material is selected from the group consisting of lithium, sodium, potassium, rubidium, cesium, calcium, strontium, barium, titantium, zirconium, hafnium, and alloys of said selected reactive material.

5. The combination of claim 1 wherein said chemical pump with a fluidized bed is in combination with an HI gas laser and wherein said reactive material is selected from the group consisting of lithium, sodium, potassium, rubidium, cesium, calcium, strontium, barium, titantium, zirconium, hafnium, and alloys of said selected reactive material.

6. The combination of claim 1 wherein said chemical pump with a fluidized bed is in combination with an HCl gas laser and wherein said reactive material is selected from the group consisting of lithium, sodium, potassium, rubidium, cesium, calcium, strontium, barium, titantium, zirconium, hafnium, and alloys of said selected reactive material.

7. The combination of claim 1 wherein said chemical pump with a fluidized bed is in combination with a bromine gas laser and wherein said reactive material is selected from the group consisting of lithium, sodium, potassium, rubidium, cesium, calcium, strontium, barium, titantium, zirconium, hafnium, and alloys of said selected reactive material.

8. The combination of claim 1 wherein said chemical pump with a fluidized bed is in combination with a CO gas laser and wherein said reactive material is selected from the group consisting of lithium, sodium, potassium, rubidium, cesium, calcium, strontium, barium, titantium, zirconium, hafnium, and alloys of said selected reactive material.

9. The combination of claim 1 wherein said chemical pump with a fluidized bed is in combination with a $CO_2$ gas laser and wherein said reactive material is selected from the group consisting of lithium, sodium, potassium, rubidium, cesium, calcium, strontium, barium, titantium, zirconium, hafnium, and alloys of said selected reactive material.

* * * * *